United States Patent [19]

Tseruel

[11] Patent Number: 5,041,960
[45] Date of Patent: Aug. 20, 1991

[54] FREQUENCY DOUBLER AND/OR SELF-OSCILLATING INVERTER

[76] Inventor: Yefim Tseruel, 15 Manchester Rd., Eastchester, N.Y. 10709

[21] Appl. No.: 482,315

[22] Filed: Feb. 20, 1990

[51] Int. Cl.$^5$ .................... H02M 5/257; H02M 5/515
[52] U.S. Cl. .................... 363/131; 363/135; 363/160; 363/163
[58] Field of Search .................... 363/8, 27, 131, 135, 363/159, 160, 163

[56] References Cited

U.S. PATENT DOCUMENTS 3,246,226  4/1966  Geisler .
3,388,313  6/1968  Fisher .
3,502,957  3/1970  Fried et al. .

FOREIGN PATENT DOCUMENTS 2004680  8/1971  Fed. Rep. of Germany ...... 363/163
2332752  1/1975  Fed. Rep. of Germany ...... 363/135
1091142  5/1984  U.S.S.R. ................................. 363/27

Primary Examiner—William H. Beha, Jr.
Attorney, Agent, or Firm—Lackenbach Siegel Marzullo & Aronson

[57] ABSTRACT

An electrical circuit receives an alternating input signal and full-wave rectifies the alternating input signal. The rectified signal is then developed by the circuit into an output signal which has a frequency double the frequency of the alternating input signal. The doubled-frequency output signal is then output to a load. Alternatively, the circuit receives a direct current input signal, converts the direct current input signal into a periodically varying output signal, and outputs the periodically varying output signal to a load.

13 Claims, 3 Drawing Sheets

FREQUENCY DOUBLER AND/OR SELF-OSCILLATING INVERTER

FIELD OF THE INVENTION

The present invention relates generally to electrical circuits and, more particularly, to an electrical circuit which doubles the frequency of an alternating input signal or converts a direct current input signal into a periodically varying output signal.

BACKGROUND OF THE INVENTION

Generally, power output by transformers and motors is maximized by increasing the frequency of signals applied to such devices. Typically, increasing the frequency of a signal is accomplished using a circuit which doubles the frequency of an alternating input signal. Additionally, such a circuit may also be used to convert a direct current input signal into a periodically varying output signal.

Several prior art circuits exist and some circuits of interest are as follows:

| U.S. Pat. No. | Inventor | Issued |
| --- | --- | --- |
| 3,044,044 | Lee | 7/62 |
| 3,668,489 | Erdman | 6/72 |
| 3,593,156 | Jordan | 7/71 |
| 4,028,612 | Orlando | 7/77 |
| 4,377,842 | Cambier | 3/83 |

However, conventional frequency-doubling circuits generally are complicated and minimally effective. The output signals created by these circuits typically contain undesirable DC components which, when applied to transformers and motors, minimize power output by these devices.

A need exists for providing a simple electrical circuit which increases the frequency of an alternating input signal or converts a direct current input signal into a periodically varying output signal. Moreover, the circuit should implement common electrical components so that it can be easily manufactured on an integrated chip and the circuit should minimize DC components of the increased frequency output signal for maximizing power output by transformers and motors.

SUMMARY OF THE INVENTION

Generally, the present invention involves applying an alternating input signal to an electrical circuit having a full-wave rectifier. The full-wave rectifier rectifies the alternating input signal to provide a full-wave rectified signal having half-sine loops each corresponding to a half-cycle of the alternating input signal. The half-sine loops are each developed into a positive half-cycle and a negative half-cycle of an output signal. Thus, the output signal has a frequency which is double the frequency of the alternating input signal.

Developing the output signal is achieved using a capacitor, a silicon-controlled rectifier (SCR) and a MOS-type field-effect transistor (MOSFET). Each half-sine loop of the rectified signal charges and discharges the capacitor. Charging of the capacitor turns on the SCR and the positive half-cycle of the output signal is developed. As the capacitor fully charges, the SCR turns off. The capacitor then begins discharging, causing the MOSFET to be turned on and the negative half-cycle of the output signal is developed. The capacitor begins charging at the start of each half-sine loop, becomes fully charged at the peak of each half-sine loop and becomes fully discharged at the completion of each half-sine loop.

In an alternative embodiment, a direct current input signal is applied to the electrical circuit in lieu of the alternating input signal, in which case the rectifier is unnecessary. A periodically varying output signal is developed by the circuit in substantially the same manner as described above. The output signal may then be applied to a transformer, for example, and the frequency of the output signal will be a function of the capacitance of the capacitor and the self-inductance of the primary coil of the transformer.

BRIEF DESCRIPTION OF THE DRAWINGS

For a fuller understanding of the invention, reference is made to the following description taken in connection with the accompanying drawings, in which.

DESCRIPTION OF THE PREFERRED EMBODIMENTS

Figure 1:
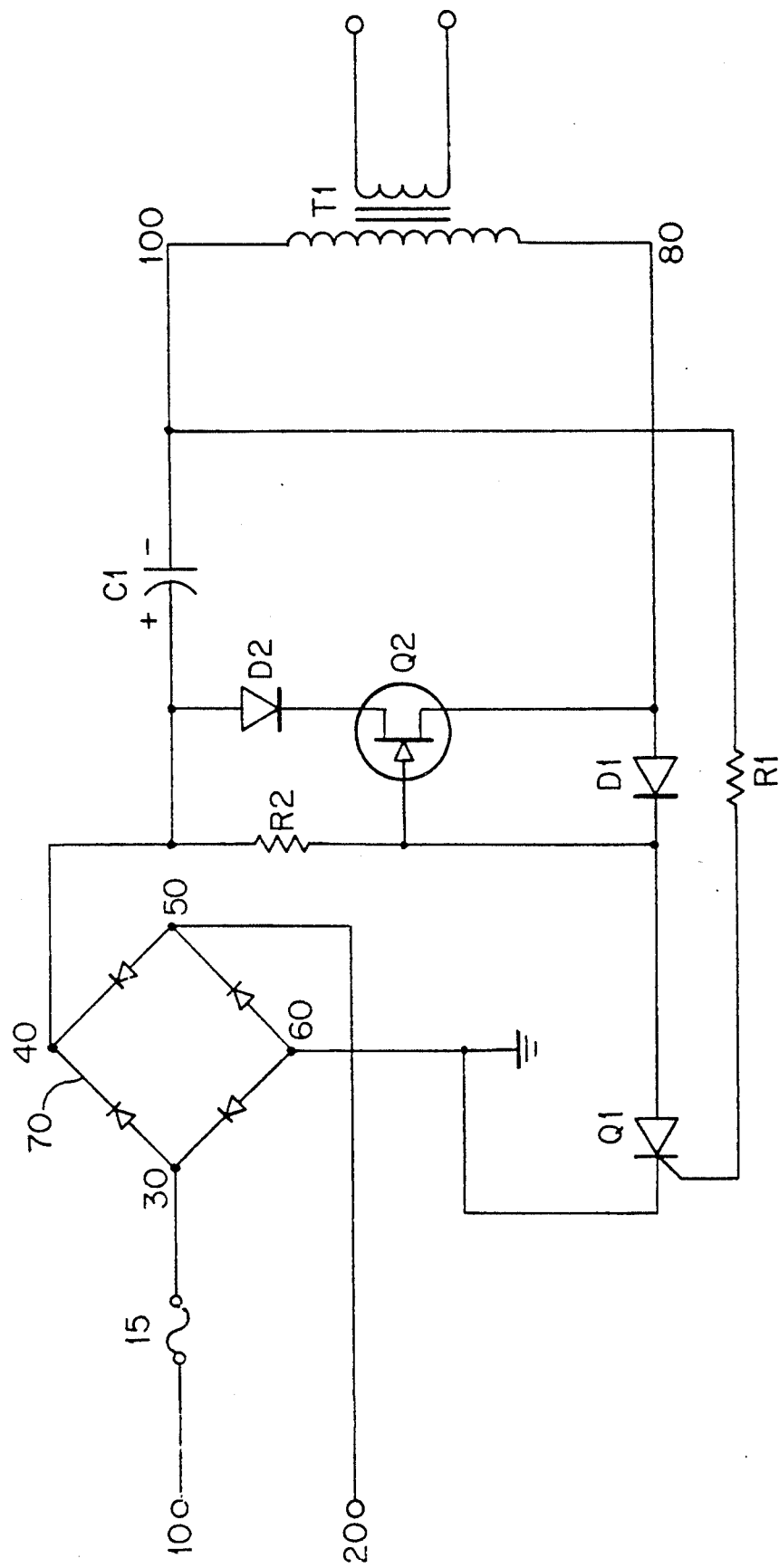
FIG. 1 is an electrical circuit diagram of a preferred embodiment of the invention.

Referring initially to FIG. 1, an input terminal 10 connects suitably through a fuse 15 to a terminal 30 of a diode-bridge full-wave rectifier 70 and an input terminal 20 connects to a terminal 50 of the diode-bridge full-wave rectifier 70. A terminal 60 of the diode-bridge full-wave rectifier 70 connects to ground and to the anode of a silicon-controlled rectifier (SCR) Q1; and a terminal 40 of the diode-bridge full-wave rectifier 70 connects to a capacitor C1, the cathode of a diode D2 and one end of a resistor R2. Preferably, the capacitor C1 is an electrolytic-type capacitor, as shown in FIG. 1. The cathode of the diode D2 connects to the drain of a MOS-type field-effect-transistor (MOSFET) Q2, such as a power MOSFET, and the other end of the resistor R2 connects to the gate of the MOSFET Q2, the anode of the SCR Q1 and the cathode of a diode D1. The anode of the diode D1 connects to the source of the MOSFET Q2 and an output terminal 80. The other end of the capacitor C1 connects to an output terminal 100, and between the capacitor C1 and the output terminal 100 connects one end of a resistor R1. The resistor R1 connects at its other end to the gate of the SCR Q1.

Figures 2A, 2B, 2C:
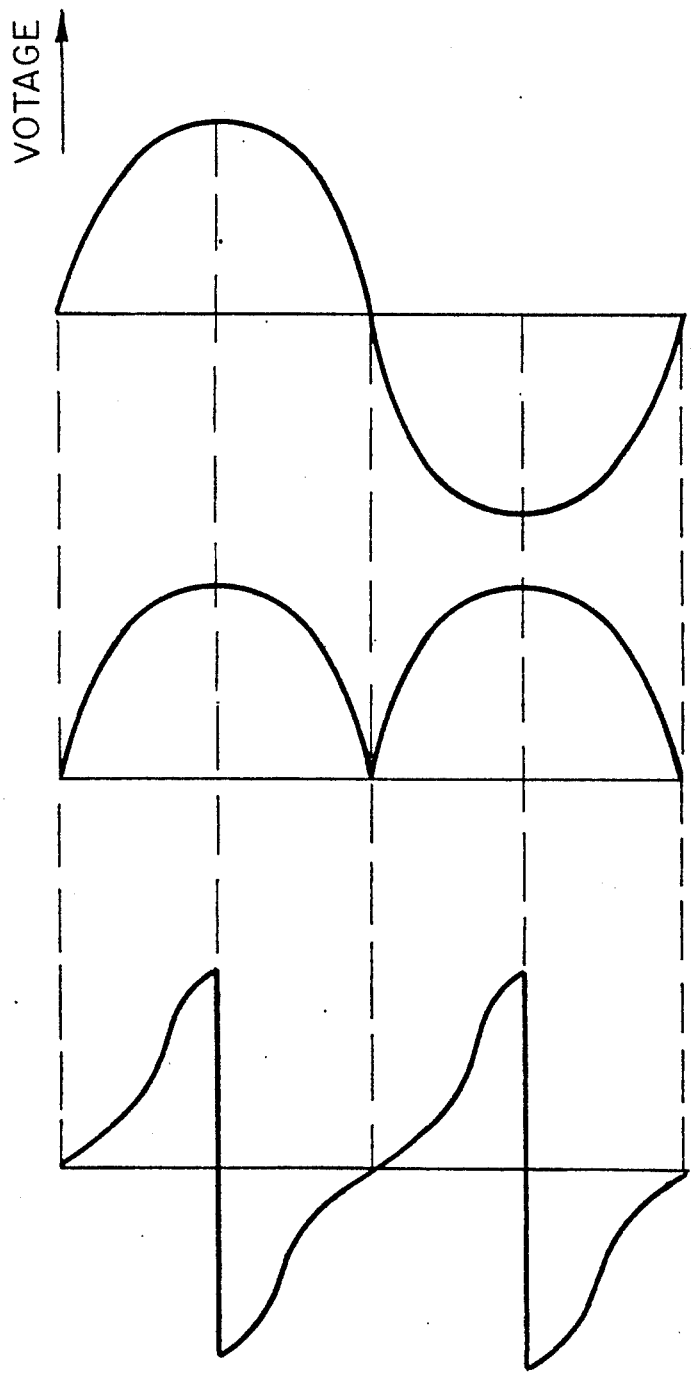
FIGS. 2(a)-2(c) illustrate waveforms of signals at various locations in the electrical circuit of FIG. 1.

In a preferred embodiment, an alternating input signal which comprises half-cycles, such as shown in FIG. 2(a), is applied to the input terminals 10 and 20 and, typically, a transformer T1 connects across the output terminals 80 and 100 and receives an output signal developed by the electrical circuit, as shown in FIG. 1.

In operation, the diode-bridge full-wave rectifier 70 receives the alternating input signal at terminals 30 and 50 from the input terminals 10 and 20, rectifies the alternating input signal and outputs a full-wave rectified signal at its terminal 40 to the capacitor C1. Advantageously, as shown in FIG. 2(b), the full-wave rectified signal comprises identical positive half-sine loops each corresponding to a respective half-cycle of the alternating input signal and each having a first half, a peak and a second half.

Referring to FIG. 2(c), each half-sine loop of the full-wave rectified signal is developed into a full-cycle of an output signal; and each full-cycle of the output signal comprises a positive half-cycle and a negative half-cycle. Particularly, the first half of each half-sine loop is developed into the positive half-cycle of a respective full-cycle of the output signal and the second half of each half-sine loop is developed into the negative half-cycle of a respective full-cycle of the output signal.

Inasmuch as the circuit of FIG. 1 operates identically for each half-sine loop of the full-wave rectified signal, the operation of the circuit will be described in further detail with respect to one half-sine loop and will be representative of each half-sine loop. The first half of the half-sine loop, through the capacitor C1 and the resistor R1, turns on or renders conducting the SCR Q1. Since the gate of the MOSFET Q2 connects to the anode of the SCR Q1 and the cathode of the SCR Q1 connects to ground, when the SCR Q1 turns on, the MOSFET Q2 will not turn on because the SCR Q1 causes the gate of the MOSFET Q2 to be grounded. Thus, current flows from the diode-bridge full-wave rectifier 70 in a forward direction, while the capacitor C1 charges, through the diode D1 and the SCR Q1 so as to develop the positive half-cycle of the output signal across the output terminals 100 and 80 to the transformer T1. Current flows in the forward direction until the capacitor C1 fully charges. Preferably, the capacitor C1 fully charges at the peak of the half-sine loop of the full-wave rectified signal. The charged capacitor C1 blocks current flow in the forward direction and the SCR Q1 is then turned off or rendered non-conducting.

Conventionally, the diode D1 separates the gate of the MOSFET Q2 from the source; and the diode D2 prevents the capacitor C1 from being thrown out of phase, i.e., it is preferable that the capacitor begins discharging at the peak of the half-sine loop and the diode D2 prevents the capacitor C1 from beginning to discharge after the peak of the half-sine loop by blocking induced voltage or inductive "kick" developed by the transformer T1 at the peak of the half-sine loop. See, generally, *Microprocessor and Interfacing: Programming and Hardware*, by Douglas V. Hall, 1986, at p. 301.

Subsequently, in response to the second half of the half-sine loop, the fully charged capacitor C1 begins discharging and current begins flowing in a reverse direction so as to turn on or render conducting the MOSFET Q2 through the resistor R2. Thus, current flows from the capacitor C1 through the resistor R2 and the MOSFET Q2 and the negative half-cycle of the output signal is developed across the output terminals 80 and 100 to the transformer T1. Current continues to flow in the reverse direction until the capacitor C1 fully discharges. Preferably, the capacitor C1 fully discharges at the completion of the half-sine loop, at which time the MOSFET Q2 turns off and the next half-sine loop and the next cycle begin.

Advantageously, the capacitor C1 fully charges and fully discharges during each half-sine loop of the full-wave rectified signal, thus providing an output signal to the transformer T1 which is changing direction at double the frequency of the alternating input signal.

Figure 3:
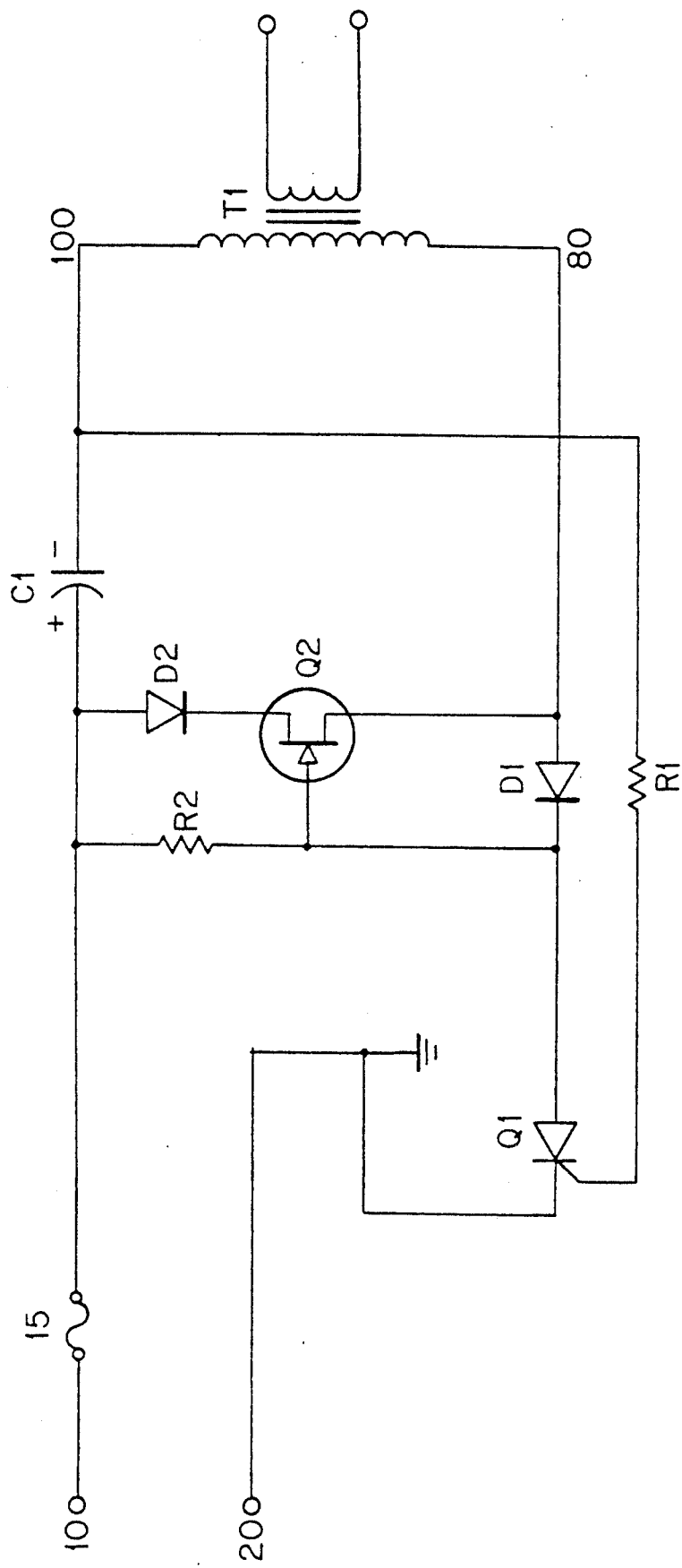
FIG. 3 is an electrical circuit diagram of another preferred embodiment of the invention.

In an alternative embodiment in accordance with the invention, a direct current input signal may be applied to the input terminals 10 and 20 in lieu of the alternating input signal, in which case the components of the electrical circuit are substantially the same as described above except that the diode-bridge full-wave rectifier 70 is unnecessary, as shown in FIG. 3. The electrical circuit also operates substantially similarly as described above. Particularly, the electrical circuit oscillates so as to convert the direct current input signal into a periodically varying output signal of which each full-cycle has a positive half-cycle and a negative half-cycle.

Referring to FIG. 3, the capacitor C1 receives the direct current input signal and begins charging. As the capacitor C1 charges, the SCR Q1 is rendered conducting by the current flowing through the capacitor C1 and the resistor R1. Thus, current flows in a forward direction through the diode D1 and the SCR Q1 so as to develop the positive half-cycle of the output signal across the output terminals 80 and 100 to the transformer T1. Current flows in the forward direction until the capacitor C1 fully charges, at which time the capacitor C1 blocks current flow in the forward direction and the SCR Q1 is rendered non-conducting. Subsequently, the fully charged capacitor C1 begins discharging and current begins flowing in a reverse direction so as to render conducting the MOSFET Q2 through the resistor R2. Thus, current flows from the capacitor C1 through the resistor R2 and the MOSFET Q2 and the negative half-cycle of the output signal is developed across the output terminals 80 and 100 to the transformer T1. Current continues to flow in the reverse direction until the capacitor C1 fully discharges, at which time the MOSFET Q2 is rendered nonconducting and the next cycle begins. As such, the circuit operates essentially as a push-pull oscillator.

In this embodiment, the frequency (f) of the output signal can be determined according to the following formula:

$$f = \frac{1}{\sqrt{LC}}$$

where L is the self-inductance of the primary coil of the transformer T1 and C is the capacitance of the capacitor C1.

Advantageously, in both the preferred embodiment (FIG. 1) and the alternative embodiment (FIG. 3), the gate of the MOSFET Q2 connects to the anode of the SCR Q1 and the cathode of the SCR Q1 connects to ground. Therefore, whether an alternating input signal or a direct current input signal is applied to the circuit, the MOSFET Q2 will always be off when the capacitor C1 is charging and the SCR Q1 is on because the SCR Q1 causes the gate of the MOSFET Q2 to be grounded, and current will only be allowed to flow in the forward direction. The MOSFET Q2 will turn on and current will be allowed to flow in the reverse direction only when the capacitor C1 is discharging and the SCR Q1 is off. As such, the circuit alternately passes between two conditions operating essentially as a flip-flop circuit.

Generally, the presently described invention has practical use in power generation, and it should be obvious to those skilled in the art that particular applications include, but are not limited to, heating, lighting, motor driving, etc. Further, in certain applications, it may be desirable to control the power output by the transformer T1. Such applications may include dimming lights, adjusting the intensity of a heater, or adjusting the speed of a motor. For these instances, a potentiometer may be added to the circuit. Referring to FIG. 1 and FIG. 3, the gate of the SCR Q1 may be connected to one end of the resistance of the potentiometer, the other end of the potentiometer will be grounded and the resistor R1 will then be connected to the potentiometer.

Thus, the potentiometer will control the signal output to the transformer T1 and the power output by the transformer T1 can be adjusted.

While the invention is disclosed and more particularly described with the presently preferred embodiments, it is not intended that the invention be limited to the described embodiments. It will be obvious to those skilled in the art that modifications may be made without departing from the scope and spirit of the invention. Thus, it is intended that the appended claims cover all equivalent variations as may be subsequently contemplated.

I claim:

1. An apparatus for developing and outputting to a load, an output signal having a frequency double the frequency of an alternating input signal, said input signal having cycles each of which comprise two half-cycles, said apparatus comprising:

full-wave rectifying means receptive of the alternating input signal for full-wave rectifying the alternating input signal and developing a full-wave rectified signal having positive half-sine loops each comprising a first half and a second half and each corresponding to a respective half-cycle of the alternating input signal; and frequency-doubling means receptive of the full-wave rectified signal for developing an output signal having a frequency double the frequency of the alternating input signal and having cycles each comprising a positive half-cycle and a negative half-cycle;

said frequency-doubling means comprising a capacitor charging and developing current flow in a forward direction in response to the first half of each half-sine loop of the full-wave rectified signal and said capacitor discharging and developing current flow in a reverse direction in response to the second half of each half-sine loop of the full-wave rectified signal, a silicon controlled rectifier having its cathode grounded, its anode connected to the load and its gate connected to the capacitor so that the gate receives current developed in the forward direction rendering the silicon controlled rectifier conductive during the charging of the capacitor for providing a current path and allowing current flow to the load in the forward direction for developing the positive half-cycles of the output signal, and said silicon controlled rectifier rendered non-conductive during the discharging of the capacitor, and a MOS-type field-effect transistor having its drain connected to the load and its gate and source connected to the capacitor so that the gate receives current developed in the reverse direction rendering the field-effect transistor conductive during the discharging of the capacitor for providing a current path and allowing current flow to the load in the reverse direction for developing the negative half-cycles of the output signal, and said field-effect transistor rendered non-conductive during the charging of the capacitor.

2. An apparatus according to claim 1, wherein said full-wave rectifying means comprises a diode-bridge full-wave rectifier.

3. An apparatus according to claim 1, wherein said capacitor is an electrolytic-type capacitor.

4. An apparatus according to claim 1, further comprising a resistor connected between the capacitor and the gate of the field-effect transistor.

5. An apparatus according to claim 1, further comprising a diode having its cathode connected to the capacitor and its anode connected to the source of the field-effect transistor.

6. An apparatus according to claim 1, further comprising a diode having its cathode connected to the drain of the field-effect transistor and its anode connected to the gate of the field-effect transistor.

7. An apparatus according to claim 1, further comprising a resistor connected between the capacitor and the gate of the silicon-controlled rectifier.

8. An oscillating apparatus which receives a direct current input signal and converts the direct current input signal into a periodically varying output signal and outputs the periodically varying output signal to a load, and said periodically varying output signal having cycles each comprising a positive half-cycle and a negative half-cycle, said oscillating apparatus comprising: a capacitor charging and developing current flow in a forward direction in response to the direct current input signal and, when fully charged, said capacitor discharging and developing current flow in a reverse direction until fully discharged, a silicon controlled rectifier having its cathode grounded, its anode connected to the load and its gate connected to the capacitor so that the gate receives current developed in the forward direction rendering the silicon controlled rectifier conductive during the charging of the capacitor for providing a current path and allowing current flow to the load in the forward direction for developing the positive half-cycles of the output signal, and said silicon controlled rectifier rendered non-conductive during the discharging of the capacitor, and a MOS-type filed-effect transistor having its drain connected to the load and its gate and source connected to the capacitor so that the gate receives current developed in the reverse direction rendering the field-effect transistor conductive during the discharging of the capacitor for providing a current path and allowing current flow to the load in the reverse direction for developing the negative half-cycles of the output signal, and said field-effect transistor rendered non-conductive during the charging of the capacitor.

9. An oscillating apparatus according to claim 8, wherein said capacitor is an electrolytic-type capacitor.

10. An oscillating apparatus according to claim 8, further comprising a resistor connected between the capacitor and the gate of the field-effect transistor.

11. An oscillating apparatus according to claim 8, further comprising a diode having its cathode connected to the capacitor and its anode connected to the source of the field-effect transistor.

12. An oscillating apparatus according to claim 8, further comprising a diode having its cathode connected to the drain of the field-effect transistor and its anode connected to the gate of the field-effect transistor.

13. An oscillating apparatus according to claim 8, further comprising a resistor connected between the capacitor and the gate of the silicon-controlled rectifier.

* * * * *